US010311715B2

United States Patent
Jopling

(10) Patent No.: US 10,311,715 B2
(45) Date of Patent: Jun. 4, 2019

(54) SMART DEVICE MIRRORING

(71) Applicant: Navico Holding AS, Egersund (NO)

(72) Inventor: Kenton Sterling Jopling, Jenks, OK (US)

(73) Assignee: NAVICO HOLDING AS, Egersund (NO)

( * ) Notice: Subject to any disclaimer, the term of this patent is extended or adjusted under 35 U.S.C. 154(b) by 690 days.

(21) Appl. No.: 14/696,782

(22) Filed: Apr. 27, 2015

(65) Prior Publication Data

US 2016/0313955 A1    Oct. 27, 2016

(51) Int. Cl.
| | |
|---|---|
| *G08C 17/02* | (2006.01) |
| *G06F 3/0484* | (2013.01) |
| *G06F 3/16* | (2006.01) |
| *H04L 29/08* | (2006.01) |
| *G06F 3/0488* | (2013.01) |
| *G06F 3/14* | (2006.01) |

(52) U.S. Cl.
CPC .......... *G08C 17/02* (2013.01); *G06F 3/0488* (2013.01); *G06F 3/04842* (2013.01); *G06F 3/1454* (2013.01); *G06F 3/16* (2013.01); *H04L 67/125* (2013.01); *G08C 2201/93* (2013.01); *G09G 2354/00* (2013.01); *G09G 2360/08* (2013.01); *G09G 2370/16* (2013.01)

(58) Field of Classification Search
CPC .................................. G06F 3/14; G06F 3/048
See application file for complete search history.

(56) References Cited

U.S. PATENT DOCUMENTS

| | | | |
|---|---|---|---|
| 2010/0262673 A1* | 10/2010 | Chang | G06F 3/1454 709/217 |
| 2014/0013276 A1* | 1/2014 | Butterworth | G06F 3/04886 715/821 |

\* cited by examiner

*Primary Examiner* — Pei Yong Weng
(74) *Attorney, Agent, or Firm* — Nelson Mullins Riley & Scarborough LLP

(57) ABSTRACT

Various implementations described herein are directed to a non-transitory computer readable medium having stored thereon computer-executable instructions which, when executed by a computer, may cause the computer to establish a connection between a marine electronics device and a smart device. The computer may initialize a graphical user interface (GUI) mirroring application on the smart device. The computer may receive a GUI from the smart device. The computer may display the GUI on the marine electronics device. The computer may also transmit commands or selections received on the marine electronics device to the smart device.

17 Claims, 6 Drawing Sheets

SMART DEVICE MIRRORING

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Operators of marine vessels may use a marine electronics device to monitor and control a marine vessel. For example, the marine electronics device may be used for navigation or for controlling an autopilot. The marine electronics device may be connected to an audio system on the marine vessel.

SUMMARY

Described herein are implementations of various technologies for a non-transitory computer-readable medium having stored thereon computer-executable instructions which, when executed by a computer, cause the computer to perform various actions. The actions may include establishing a connection between a marine electronics device and a smart device. The actions may include initializing a graphical user interface (GUI) mirroring application on the smart device. The actions may include receiving a GUI from the smart device. The actions may include displaying the GUI on the marine electronics device. The actions may also include transmitting commands or selections received on the marine electronics device to the smart device.

Described herein are also implementations of various technologies for a non-transitory computer-readable medium having stored thereon computer-executable instructions which, when executed by a computer, cause the computer to perform various actions. The actions may include displaying a plurality of application icons on a marine electronics device. The applications icons correspond to applications on a smart device. The actions may include receiving a selection of one of the application icons. The actions may include transmitting a command to the smart device causing the smart device to initialize an application corresponding to the selected application icon. The actions may also include displaying a graphical user interface of the smart device on the marine electronics device.

Described herein are also implementations of various technologies for a non-transitory computer-readable medium having stored thereon computer-executable instructions which, when executed by a computer, cause the computer to perform various actions. The actions may include receiving a selection at a marine electronics device to display a mirrored graphical user interface (GUI) of a smart device. The actions may include establishing a connection between the marine electronics device and the smart device. The actions may include initializing a GUI mirroring application on the smart device. The actions may include receiving a GUI from the smart device. The actions may include displaying the GUI on the marine electronics device. The actions may also include transmitting input received on the marine electronics device to the smart device.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Various implementations described herein will now be described in more detail with reference to FIGS. 1-6.

Figure 1:
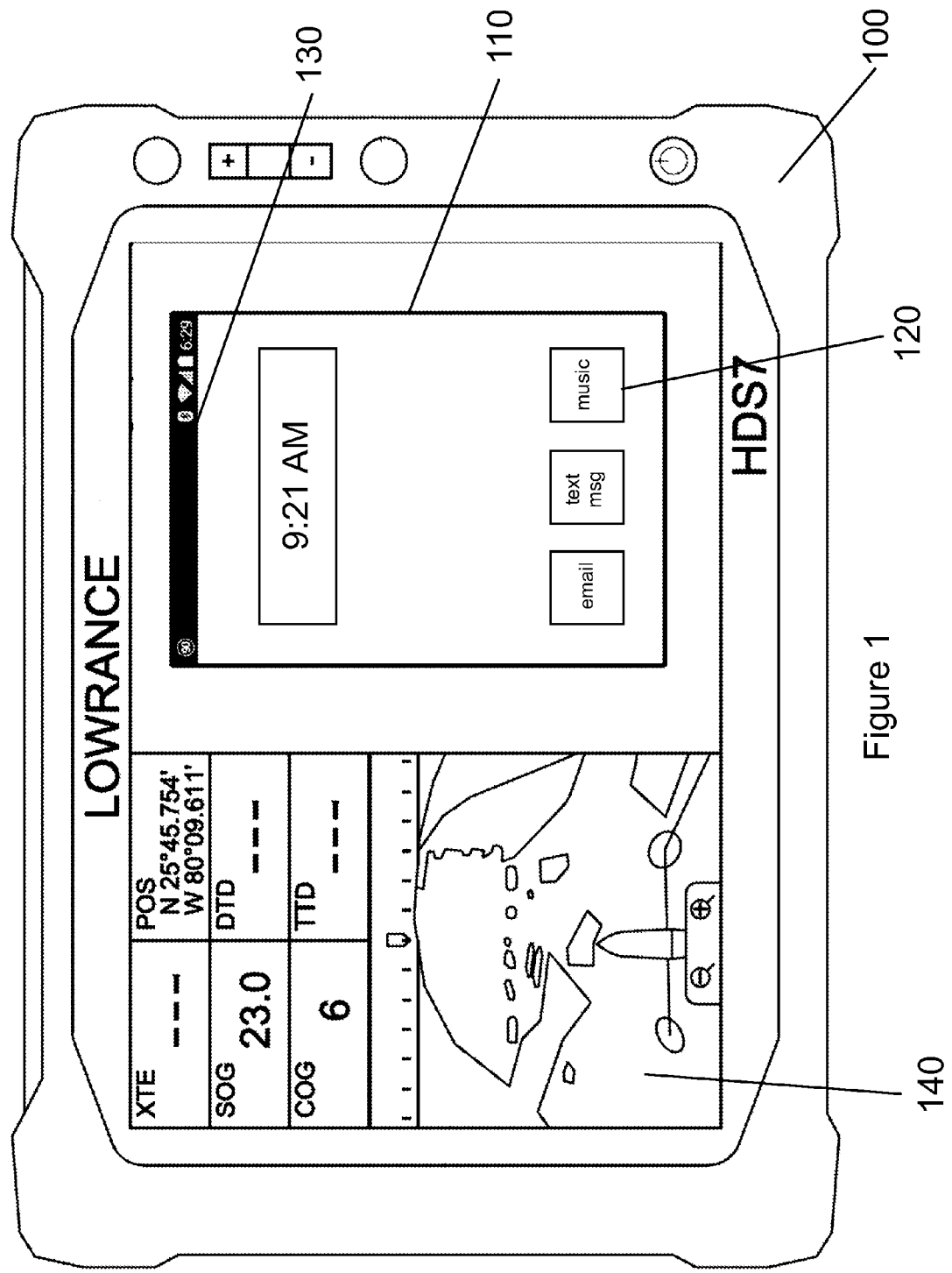
FIG. 1 illustrates a marine electronics device with smart device mirroring in accordance with implementations of various techniques described herein.

FIG. 1 illustrates a marine electronics device 100 with smart device mirroring in accordance with implementations of various techniques described herein. The marine electronics device 100 is explained in further detail in FIG. 6, described below. The marine electronics device 100 simultaneously displays marine data 140 and a smart device graphical user interface (GUI) 110.

The mirrored GUI 110 is mirrored from a smart device (not shown). The smart device is a smart phone, tablet, or other smart device that is communicating with the marine electronics device 100 using either a wired or wireless connection. The GUI displayed on the smart device is also displayed, or mirrored, on the marine electronics device 100. The mirrored GUI 110 may have a different aspect ratio or different dimensions from the GUI displayed on the smart device. The mirrored GUI 110 may only show portions of the GUI displayed on the smart device. For example, the mirrored GUI 110 may be a cropped portion of the smart device GUI.

The mirrored GUI 110 may include a status bar 130 and buttons 120. If a button 120 is selected on the marine electronics device 100, the selection will be transmitted to the smart device. By making selections on the mirrored GUI 110, the connected smart device can be controlled using the marine electronics device 100. For example, when a user selects an icon or button on the mirrored GUI 110, the selection is transmitted to the smart device, and the smart device performs an activity corresponding to the selection.

When the smart device GUI is mirrored on the marine electronics device 100, a user can see the same display, or interface, on the smart device and on the marine electronics device 100. The user may also be able to perform the same actions on the smart device and on the marine electronics device 100. If the display on the smart device changes, those changes are mirrored on the marine electronics device 100. In one implementation, a user can place a smart device in an enclosed compartment, like a glove box, and continue to interact with the smart device using the marine electronics device 100.

Figure 2:
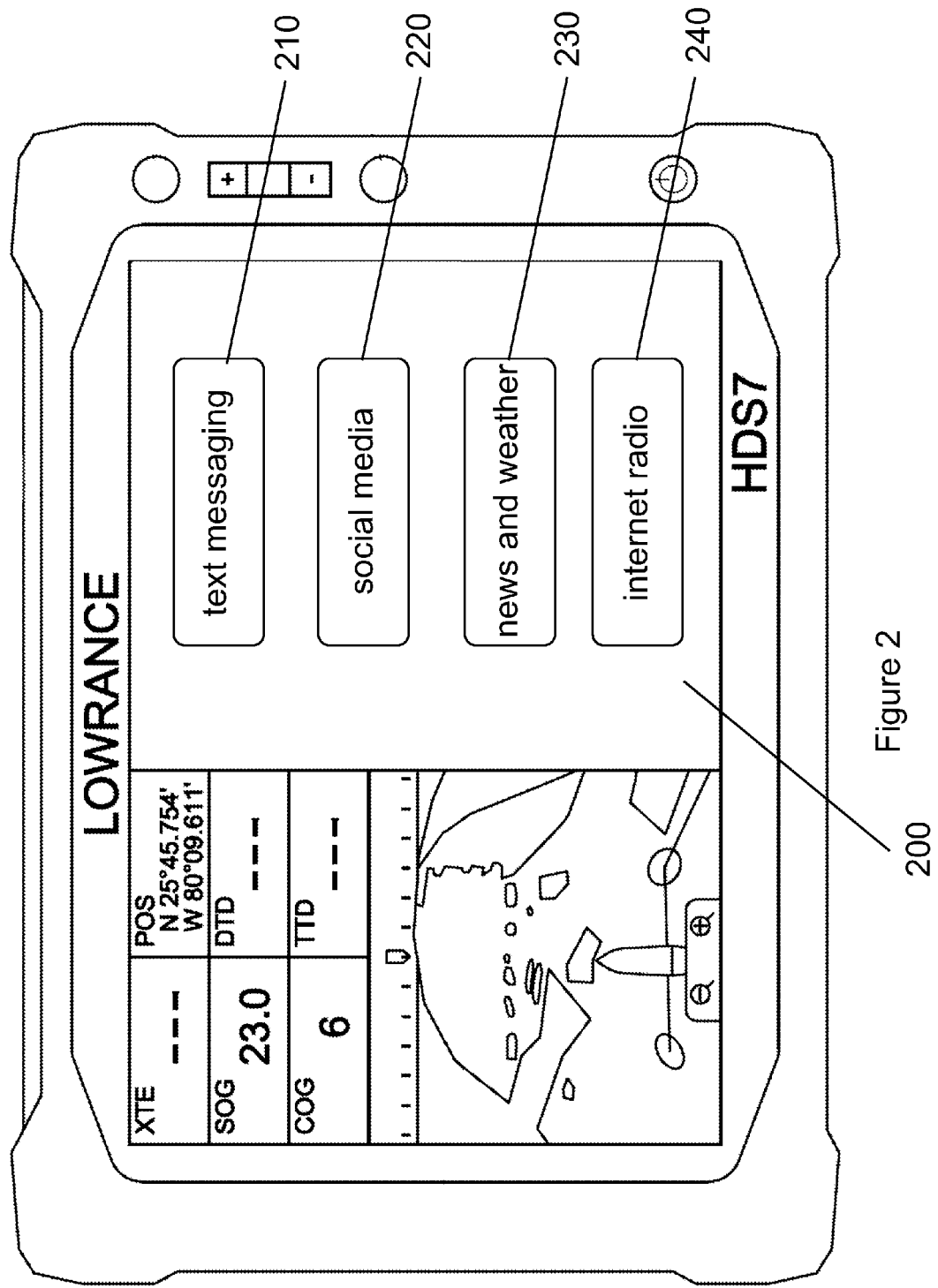
FIG. 2 illustrates a marine electronics device with application mirroring in accordance with implementations of various techniques described herein.

FIG. 2 illustrates a marine electronics device with application mirroring in accordance with implementations of various techniques described herein. A smart device control interface 200 may include buttons 210, 220, 230 and 240. The buttons 210, 220, 230 and 240 may be used to perform various functions on a smart device. For example, by pressing button 210, a text messaging application may be activated on the connected smart device. In this example, after activating the text messaging application, the GUI of the smart device may be mirrored on the marine electronics device. In another example, if a user selects button 240, an internet radio application may be activated on the connected smart device. In this example, audio from the internet radio application may be transmitted to the marine electronics device and output through speakers on the vessel or through an audio system connected to the marine electronics device. In one implementation, buttons for controlling an audio player application on the smart device may be displayed on the marine electronics device.

Figure 3:
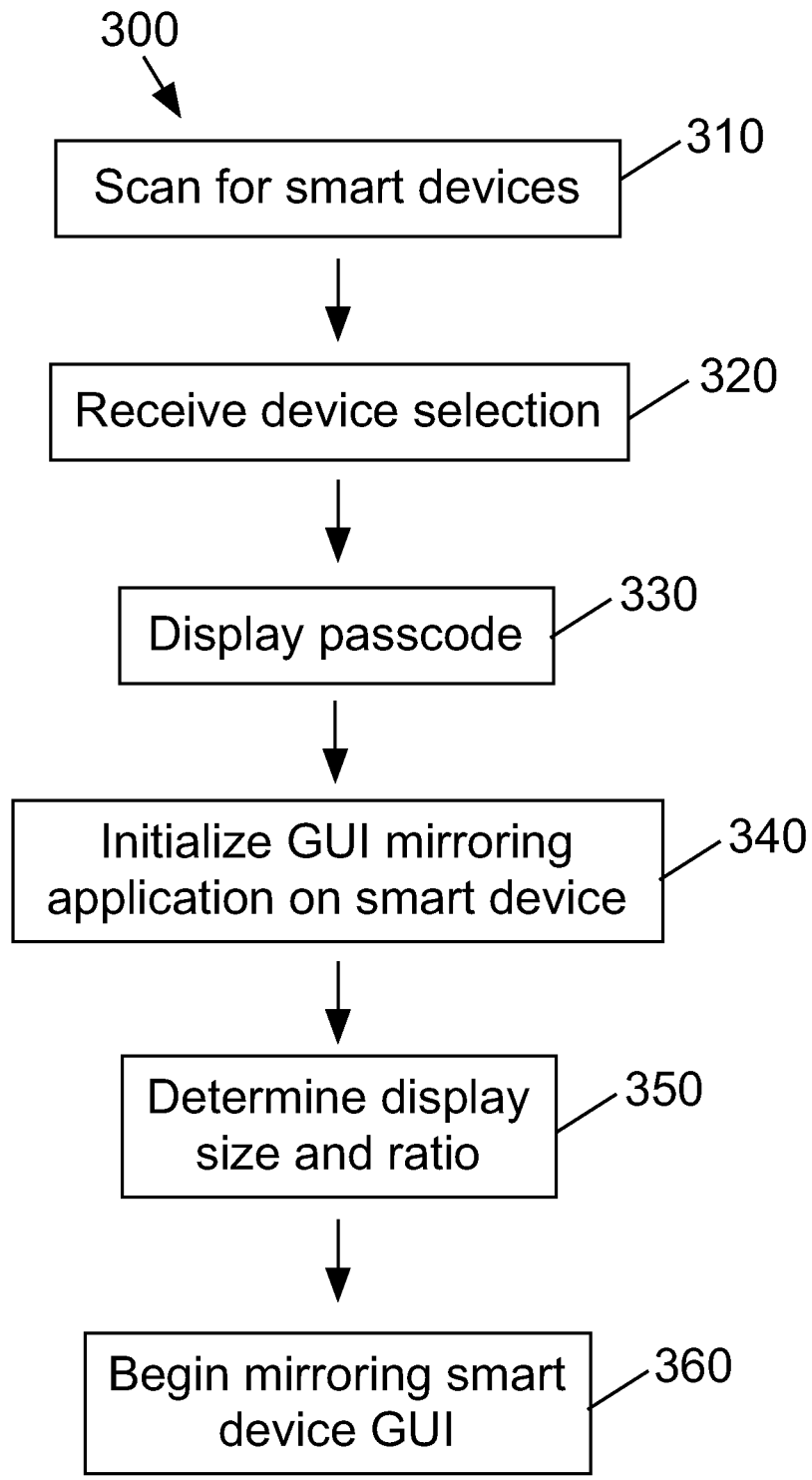
FIG. 3 is a flow diagram of a method for mirroring a smart device interface in accordance with implementations of various techniques described herein.

FIG. 3 is a flow diagram of a method 300 for mirroring a smart device interface in accordance with implementations of various techniques described herein. In one implementation, method 300 may be performed by any computer system 500, including a marine electronics device 600 and the like. It should be understood that while method 300 indicates a particular order of execution of operations, in some implementations, certain portions of the operations might be executed in a different order, and on different systems. Further, in some implementations, additional operations or steps may be added to the method 300. Likewise, some operations or steps may be omitted.

At block 310, a scan for smart devices may be performed. The scan may be performed over a wired or wireless network, including Ethernet and Wi-Fi™, over Bluetooth, or by determining whether a device is connected to a cable, such as a USB™ or Lightning™ cable. In one implementation, a user may place the smart device in "discoverable mode," or make a selection on the smart device so that the smart device will be detected during the scan.

At block 320, a smart device selection is received. For example, if three smart devices are discovered in the scan, a user may select one of the devices for connecting to a marine electronics device. This step is optional. For example, if a smart device is connected to a marine electronics device using a cable, a device selection may not be necessary.

At block 330, a passcode may be displayed on either the marine electronics device or the smart device. This step is optional. For example, a passcode may be displayed on the marine electronics device and entered in the smart device. In another example, the passcode may be displayed on the smart device and entered in the marine electronics device. In yet another example, a passcode may be displayed on both devices, and a user may confirm that the passcode is the same on both devices.

At block 340, a GUI mirroring application may be initialized, or activated, on the smart device. In one implementation, a signal or command to start the GUI mirroring application may be transmitted from the marine electronics device to the smart device. In another implementation, the smart device may detect a connection to the marine electronics device and initialize the GUI mirroring application. In yet another implementation, a user may make a selection on the smart device in order to initialize the GUI mirroring application. The GUI mirroring application may be an application that allows the smart device to be controlled using the marine electronics device. The GUI mirroring application may be an application designed for the iOS™ operating system, Android™ operating system, Windows Phone™ operating system, or another smart device operating system.

At block 350, a display size and aspect ratio may be determined for mirroring the smart device GUI on the marine electronics device. For example, if the smart device GUI has a height of 500 pixels and a width of 250 pixels, and the allotted space on the marine electronics device has a height of 1000 pixels and a width of 500 pixels, the ratio would be 2:1.

At block 360, the marine electronics device may begin mirroring the smart device GUI. The GUI may be resized for display on the marine electronics device using the display size or aspect ratio determined at block 350. FIG. 1 illustrates a marine electronics device with a mirrored smart device GUI. The mirrored display may be a home screen or application launcher used on the smart device.

Selections or commands that are input on the marine electronics device may be transmitted to the smart device. The display size and aspect ratio selected at block 350 may also be used to map input on the marine electronics device to the smart device. For example, if a user makes a touch selection on a touchscreen on the marine electronics device, a pixel location corresponding to the touch selection may be transmitted to the smart device.

Figure 4:
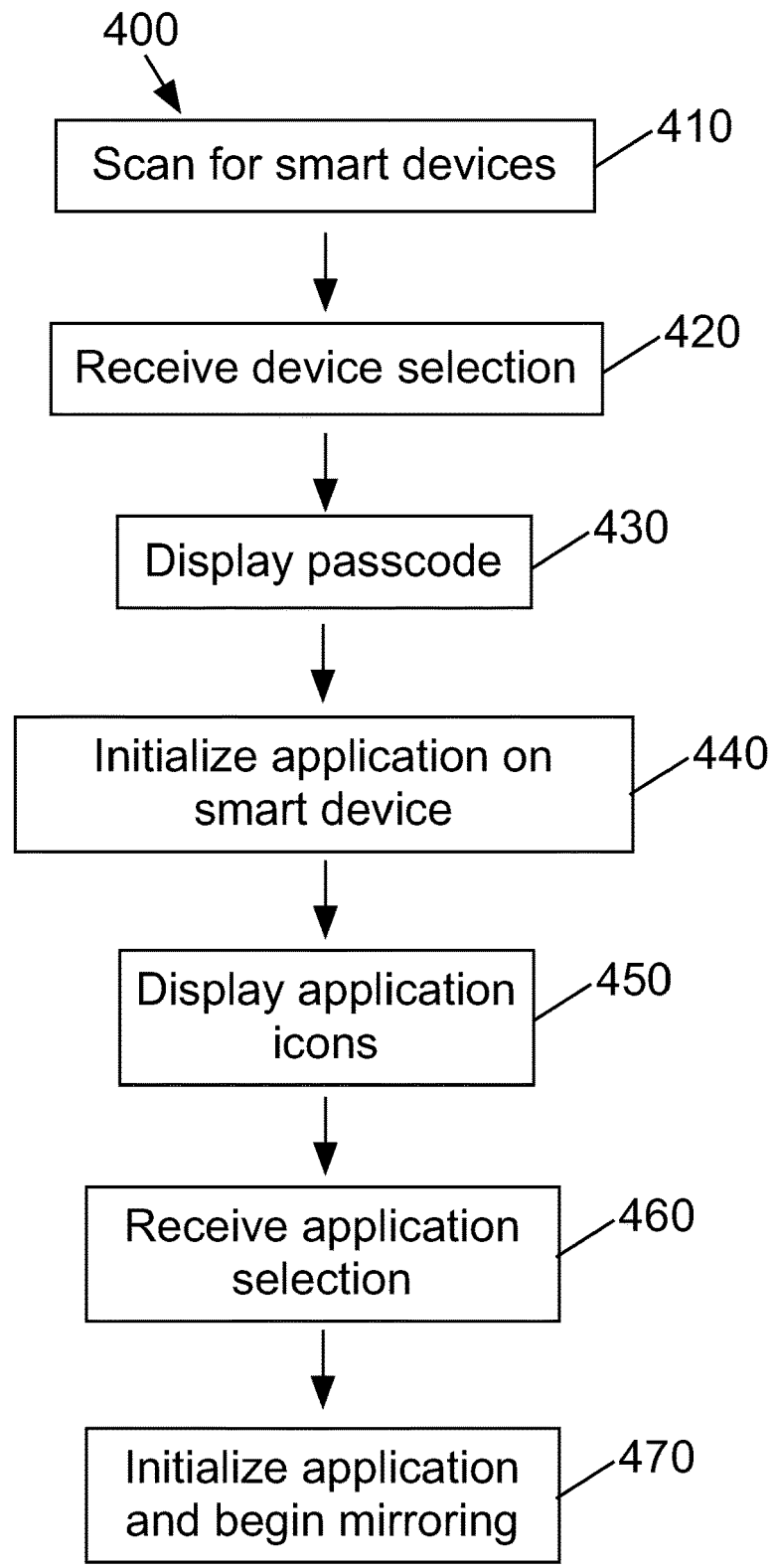
FIG. 4 is a flow diagram of a method for controlling a smart device in accordance with implementations of various techniques described herein.

FIG. 4 is a flow diagram of a method for controlling a smart device in accordance with implementations of various techniques described herein. In one implementation, method 400 may be performed by any computer system 500, including a marine electronics device 600 and the like. It should be understood that while method 400 indicates a particular order of execution of operations, in some implementations, certain portions of the operations might be executed in a different order, and on different systems. Further, in some implementations, additional operations or steps may be added to the method 400. Likewise, some operations or steps may be omitted.

At block 410, the method 400 may scan for smart devices. Other actions similar to those performed at block 310 may be performed at block 410.

At block 420, a smart device selection may be received. Other actions similar to those performed at block 320 may be performed at block 420.

At block 430, a passcode may be displayed. Other actions similar to those performed at block 330 may be performed at block 430.

At block 440, an application capable of transmitting data between the smart device and a marine electronics device may be initialized on the smart device. Other actions similar to those performed at block 340 may be performed at block 440.

At block 450, application icons or buttons may be displayed on a marine electronics device. The application icons may correspond to applications or functions on the connected smart device. The displayed icons may be preselected by a user or correspond to the applications that were previously used. For example, the icons may be controls for an audio player application on the smart device. In another example, the icons may correspond to applications displayed on a home screen or application launcher of the smart device.

At block 460, an application selection may be received. For example, if a 'music player' button is displayed at block 450, a user may select the 'music player' button at block 460. The selection may be transmitted from the marine electronics device to the smart device.

At block 470, the application selected at block 460 may be initialized and displayed on the smart device, marine electronics device, or both. In one implementation, after initializing an application, the smart device GUI displaying the application may be mirrored on the marine electronics device. In this implementation, if the application is closed, the marine electronics display will stop mirroring the smart device GUI, return to block 450, and display application icons or buttons.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 5:
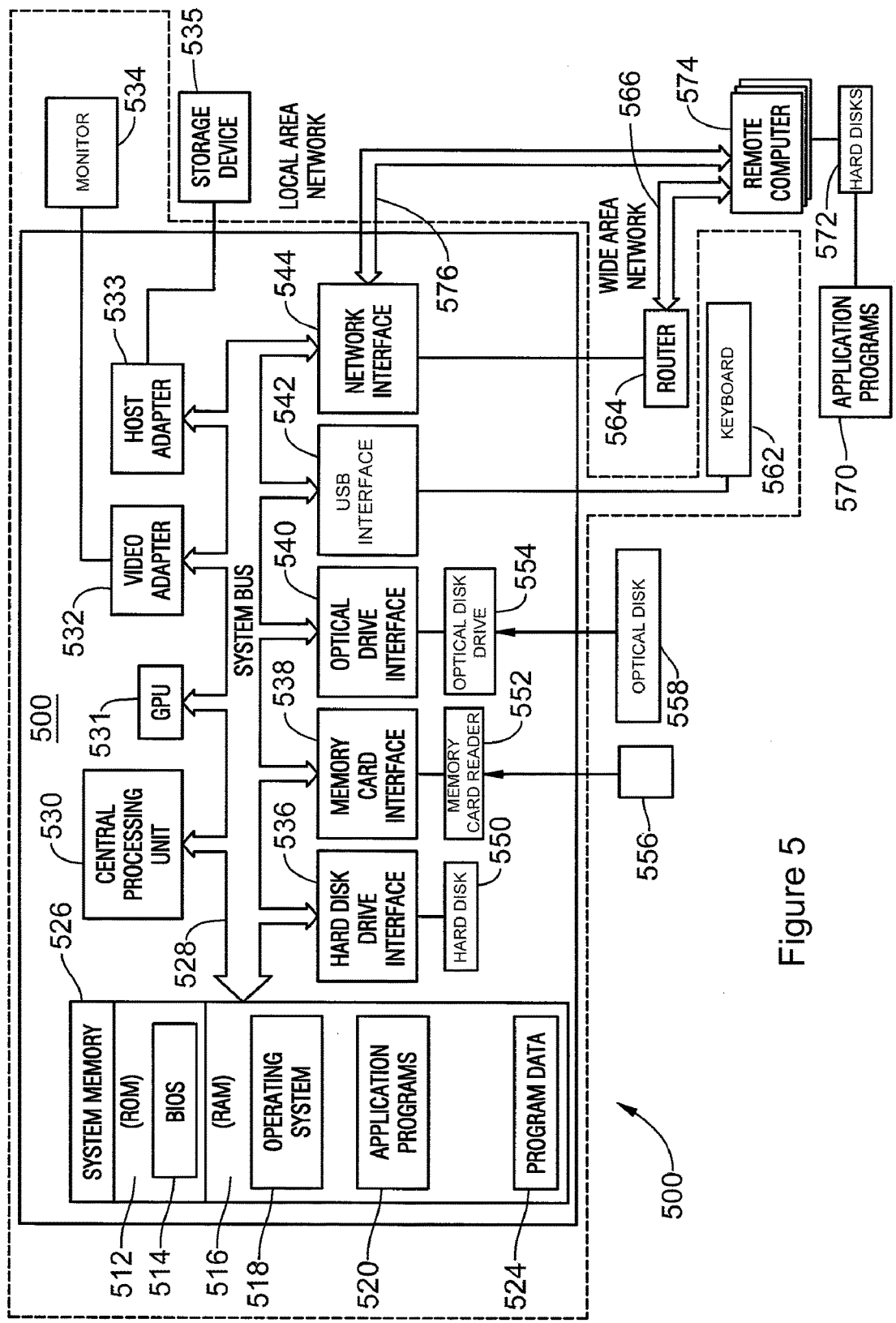
FIG. 5 illustrates a schematic diagram of a computing system in which the various technologies described herein may be incorporated and practiced.

FIG. 5 illustrates a computer system 500 into which implementations of various technologies and techniques described herein may be implemented. Computing system 500 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 500 may include a central processing unit (CPU) 530, a system memory 526 and a system bus 528 that couples various system components including the system memory 526 to the CPU 530. Although only one CPU 530 is illustrated in FIG. 5, it should be understood that in some implementations the computing system 500 may include more than one CPU 530.

The CPU 530 can include a microprocessor, a microcontroller, a processor, a programmable integrated circuit, or a combination thereof. The CPU 530 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 530 may also include a proprietary processor. The CPU may include a multi-core processor.

The CPU 530 may provide output data to a Graphics Processing Unit (GPU) 531. The GPU 531 may generate graphical user interfaces that present the output data. The GPU 531 may also provide objects, such as menus, in the graphical user interface. A user may provide inputs by interacting with the objects. The GPU 531 may receive the inputs from interaction with the objects and provide the inputs to the CPU 530. In one implementation, the CPU 530 may perform the tasks of the GPU 531. A video adapter 532 may be provided to convert graphical data into signals for a monitor 534, which may also be referred to as a screen. The monitor 534 can be sensitive to heat or touching (now collectively referred to as a "touch screen"). In one implementation, the computer system 500 may not include a monitor 534.

The GPU 531 may be a microprocessor specifically designed to manipulate and implement computer graphics. The CPU 530 may offload work to the GPU 531. The GPU 531 may have its own graphics memory, and/or may have access to a portion of the system memory 526. As with the CPU 530, the GPU 531 may include one or more processing units, and each processing unit may include one or more cores.

The system bus 528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 526 may include a read only memory (ROM) 512 and a random access memory (RAM) 516. A basic input/output system (BIOS) 514, containing the basic routines that help transfer information between elements within the computing system 500, such as during start-up, may be stored in the ROM 512. The computing system may be implemented using a printed circuit board containing various components including processing units, data storage memory, and connectors.

Certain implementations may be configured to be connected to a GPS and/or a sonar system. The GPS and/or sonar system may be connected via the network interface 544 or Universal Serial Bus (USB) interface 542. In one implementation, the computing system 500, the monitor 534, the screen 505 and buttons may be integrated into a console.

The computing system 500 may further include a hard disk drive 536 for reading from and writing to a hard disk 550, a memory card reader 552 for reading from and writing to a removable memory card 556 and an optical disk drive 554 for reading from and writing to a removable optical disk 558, such as a CD ROM, DVD ROM or other optical media.

The hard disk drive 550, the memory card reader 552 and the optical disk drive 554 may be connected to the system bus 528 by a hard disk drive interface 536, a memory card interface 538 and an optical drive interface 540, respectively. The drives and their associated computer-readable media may provide nonvolatile storage of computer-readable instructions, data structures, program modules and other data for the computing system 500.

Although the computing system 500 is described herein as having a hard disk 550, a removable memory card 556 and a removable optical disk 558, it should be appreciated by those skilled in the art that the computing system 500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 500 may also include a host adapter 533 that connects to a storage device 535 via a small computer system interface (SCSI) bus, a Fiber Channel bus, an eSATA bus, or using any other applicable computer bus interface. The computing system 500 can also be connected to a router 564 to establish a wide area network (WAN) 566 with one or more remote computers 574. The router 564 may be connected to the system bus 528 via a network interface 544. The remote computers 574 can also include hard disks 572 that store application programs 570.

In another implementation, the computing system 500 may also connect to one or more remote computers 574 via local area network (LAN) 576 or the WAN 566. When using a LAN networking environment, the computing system 500 may be connected to the LAN 576 through the network interface or adapter 544. The LAN 576 may be implemented via a wired connection or a wireless connection. The LAN 576 may be implemented using Wi-Fi technology, cellular technology, or any other implementation known to those skilled in the art. The network interface 544 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 574. It will be appreciated that the network connections shown are exemplary and other means of establishing a communications link between the computer systems may be used. The network interface 544 may also include digital cellular networks, Bluetooth, or any other wireless network interface.

A number of program modules may be stored on the hard disk 550, memory card 556, optical disk 558, ROM 512 or RAM 516, including an operating system 518, one or more application programs 520, program data 524 and a database system. The one or more application programs 520 may contain program instructions configured to perform methods 300 or 400 according to various implementations described herein. The operating system 518 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 500 through input devices such as a keyboard 562 and pointing device. Other input devices may include a microphone, joystick, game pad, satellite dish, scanner, user input button, wearable device, or the like. These and other input devices may be connected to the CPU 530 through a USB interface 542 coupled to system bus 528, but may be connected by other interfaces, such as a parallel port, Bluetooth or a game port. A monitor 505 or other type of display device may also be connected to system bus 528 via an interface, such as a video adapter 532. In addition to the monitor 534, the computing system 500 may further include other peripheral output devices such as speakers and printers.

Marine Electronics Device

Figure 6:
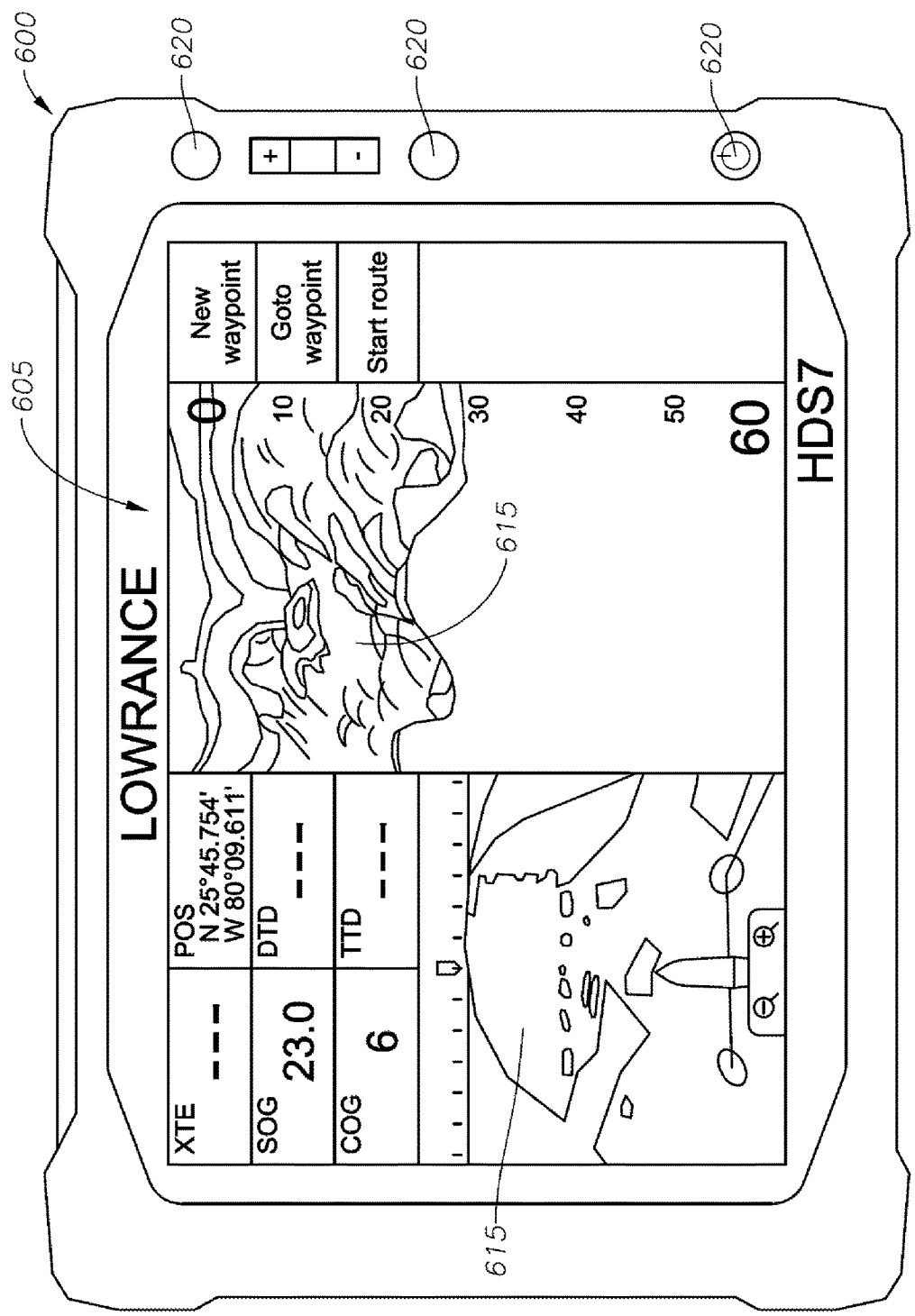
FIG. 6 illustrates a schematic of a marine electronics device in accordance with implementations of various techniques described herein.

FIG. 6 illustrates a schematic diagram of a marine electronics device 600 in accordance with various implementations described herein. The marine electronics device 600 includes a screen 605. In certain implementations, the screen 605 may be sensitive to touching by a finger. In other implementations, the screen 605 may be sensitive to the body heat from the finger, a stylus, or responsive to a mouse. The marine electronics device 600 may be attached to a National Marine Electronics Association (NMEA) bus or network. The marine electronics device 600 may send or receive data to or from another device attached to the NMEA 2000 bus. For example, the marine electronics device 600 may transmits commands and receive data from a motor or a sensor using an NMEA 2000 bus. The marine electronics device 600 may transmit or receive NMEA 2000 compliant messages, messages in a proprietary format that do not interfere with NMEA 2000 compliant messages or devices, or messages in any other format. The device 600 may display marine electronic data 615. The marine electronic data types 615 may include chart data, radar data, sonar data, steering data, dashboard data, navigation data, fishing data, and the like. The marine electronics device 800 may also include a plurality of buttons 620, which may be either physical buttons or virtual buttons, or a combination thereof. The marine electronics device 600 may receive input through a screen 605 sensitive to touch or buttons 620.

It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it should be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It should also be understood that the term "and/or" as used herein refers to and encompasses any and all possible combinations of one or more of the associated listed items. It should be further understood that the terms "includes," "including," "comprises" and/or "comprising," when used in this specification, specify the presence of stated features, integers, steps, operations, elements, and/or components, but should not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" should not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It should be understood that a "request" or "can request" can also include, but are not limited to, touching a screen, double tapping a screen (tapping the screen twice in rapid succession), pressing a particular physical or virtual button, making a selection from a menu, swiping the screen (placing a finger towards an edge of the screen and traversing the screen while maintaining contact between the finger and the screen) placement of a cursor at a particular location, stylus pointing, mouse selection, an audible command, as well as the explicit description of the "request" for the particular operations.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer readable medium having stored thereon a plurality of computer-executable instructions which, when executed by a computer, cause the computer to:
    establish a connection between a marine electronics device connected to a vessel and a remotely-located smart device, wherein the marine electronics device is configured to monitor and control marine features corresponding to the vessel, wherein the marine electronics device is configured to display marine data including at least one of chart data, radar data, sonar data, steering data, dashboard data, navigation data, or fishing data;
initialize a graphical user interface (GUI) mirroring application on the smart device;
receive a GUI from the smart device;
    display the GUI on a screen of the marine electronics device; and
    transmit, one or more commands or selections received on the marine electronics device to the smart device; and
    display the GUI on a first portion of the screen of the marine electronics device; and simultaneously display the marine data on a second portion of the screen of the marine electronics device.

2. The non-transitory computer readable medium of claim 1, wherein the connection between the marine electronics device and smart device is established over Bluetooth, Wi-Fi, a wireless connection, or by a cable connecting the marine electronics device to the smart device.

3. The non-transitory computer readable medium of claim 1, wherein the GUI mirroring application transmits an image displayed on the smart device to the marine electronics device.

4. The non-transitory computer readable medium of claim 1, wherein the computer-executable instructions that cause the computer to display the GUI on the marine electronics device further comprise computer-executable instructions that cause the computer to:
    receive dimensions of the GUI;
    receive dimensions for a mirrored display on the marine electronics device; and
    display the GUI on the marine electronics device by resizing the GUI to the received dimensions for the mirrored display.

5. The non-transitory computer readable medium of claim 1, wherein the computer-executable instructions that cause the computer to transmit commands or selections received on the marine electronics device to the smart device further comprise computer-executable instructions that cause the computer to:

receive a pixel location selection on the marine electronics device; and determine a pixel location on the smart device corresponding to the selection.

6. The non-transitory computer readable medium of claim 1, wherein the computer-executable instructions that cause the computer to transmit commands or selections received on the marine electronics device to the smart device further comprise computer-executable instructions that cause the computer to:
receive a selection corresponding to a button on the smart device GUI; and transmit a description of the button selection to the smart device.

7. The non-transitory computer readable medium of claim 1, further comprising instructions that cause the computer to:
receive data corresponding to audio output from the smart device; and play the audio output over a speaker system on a vessel.

8. The non-transitory computer readable medium of claim 1, wherein the smart device is a smart phone or tablet computer.

9. A non-transitory computer readable medium having stored thereon a plurality of computer-executable instructions which, when executed by a computer, cause the computer to:
display a plurality of application icons on a marine electronics device connected to a vessel, wherein the application icons correspond to applications on a remotely-located smart device, wherein the marine electronics device is configured to monitor and control marine features corresponding to the vessel, wherein the marine electronics device is configured to display marine data including at least one of chart data, radar data, sonar data, steering data, dashboard data, navigation data, or fishing data;
receive a selection of one of the application icons;
transmit a command to the smart device causing the smart device to initialize an application corresponding to the selected application icon; and
display a graphical user interface (GUI) of the smart device on a screen of the marine electronics device; and
display the GUI on a first portion of the screen of the marine electronics device; and simultaneously display the marine data on a second portion of the screen of the marine electronics device.

10. The non-transitory computer readable medium of claim 9, wherein the instructions configured to display the graphical user interface comprises instructions to display the application corresponding to the selected application icons.

11. The non-transitory computer readable medium of claim 9, wherein the marine electronics device and smart device are connected over Bluetooth, Wi-Fi, or a wireless connection.

12. The non-transitory computer readable medium of claim 9, wherein the application icons correspond to preselected applications.

13. The non-transitory computer readable medium of claim 9, wherein the application icons are buttons.

14. The non-transitory computer readable medium of claim 9, wherein the computer-executable instructions that cause the computer to receive a selection of one of the application icons comprise computer executable instructions that cause the computer to receive a selection made by a user on a touchscreen.

15. The non-transitory computer readable medium of claim 9, wherein the computer-executable instructions further cause the computer to:
transmit a command to the smart device to terminate the application; and display the plurality of application icons on the marine electronics device.

16. A non-transitory computer readable medium having stored thereon a plurality of computer-executable instructions which, when executed by a computer, cause the computer to:
receive a selection at a marine electronics device connected to a vessel to display a mirrored graphical user interface (GUI) of a remotely-located smart device, wherein the marine electronics device is configured to monitor and control marine features corresponding to the vessel, wherein the marine electronics device is configured to display marine data including at least one of chart data, radar data, sonar data, steering data, dashboard data, navigation data, or fishing data;
establish a connection between the marine electronics device and the smart device;
initialize a GUI mirroring application on the smart device;
receive a GUI from the smart device;
display the GUI on a screen of the marine electronics device; and transmit input received on the marine electronics device to the smart device; and
display the GUI on a first portion of the screen of the marine electronics device; and simultaneously display the marine data on a second portion of the screen of the marine electronics device.

17. The non-transitory computer readable medium of claim 16, wherein the computer-executable instructions that cause the computer to receive the selection at the marine electronics device to display the mirrored GUI of the smart device comprise computer executable instructions that cause the computer to detect that a button or icon has been selected.

* * * * *